(12) United States Patent
Jogsch et al.

(10) Patent No.: US 8,813,945 B2
(45) Date of Patent: Aug. 26, 2014

(54) APPARATUS AND METHOD FOR TREATING CONTAINERS WITH ROTATION OF THE CONTAINERS

(75) Inventors: Michael Jogsch, Barbing (DE); Stefan Raith, Pfatter (DE)

(73) Assignee: Krones AG, Neutraubling (DE)

( * ) Notice: Subject to any disclaimer, the term of this patent is extended or adjusted under 35 U.S.C. 154(b) by 68 days.

(21) Appl. No.: 13/370,955

(22) Filed: Feb. 10, 2012

(65) Prior Publication Data
US 2012/0205218 A1 Aug. 16, 2012

(30) Foreign Application Priority Data
Feb. 15, 2011 (DE) .......................... 10 2011 011 316

(51) Int. Cl.
*B65G 47/244* (2006.01)
(52) U.S. Cl.
CPC .................................... *B65G 47/244* (2013.01)
USPC ......... 198/400; 198/415; 198/459.4; 198/663
(58) Field of Classification Search
USPC .............. 198/387, 394, 400, 411, 415, 459.3, 198/459.4, 663
See application file for complete search history.

(56) References Cited

U.S. PATENT DOCUMENTS

| | | | |
|---|---|---|---|
| 1,750,315 A * | 3/1930 | Franks et al. ................. | 198/400 |
| 3,012,650 A * | 12/1961 | Carter ........................... | 198/382 |
| 3,054,496 A * | 9/1962 | Carter ........................ | 198/459.4 |
| 3,467,237 A | 9/1969 | Hanekamp et al. | |
| 3,827,211 A | 8/1974 | Zavatone et al. | |
| 4,041,124 A * | 8/1977 | Seelye ........................... | 264/336 |
| 4,561,534 A | 12/1985 | Nalbach | |
| 4,832,173 A * | 5/1989 | Hattori et al. .............. | 198/377.1 |
| 5,472,076 A * | 12/1995 | Sommer ....................... | 198/412 |
| 5,542,233 A | 8/1996 | Graffin | |
| 5,701,726 A * | 12/1997 | Smith ............................ | 53/544 |
| 7,681,749 B2 * | 3/2010 | Peronek ........................ | 215/40 |
| 2004/0115012 A1 | 6/2004 | Seidl et al. | |

FOREIGN PATENT DOCUMENTS

DE 202005006755 U1 10/2005

* cited by examiner

*Primary Examiner* — Mark A Deuble
(74) *Attorney, Agent, or Firm* — Greer, Burns & Crain, Ltd.

(57) ABSTRACT

An apparatus for treating containers, including a first treatment unit which treats the containers in a first predefined manner, a transport device which transports the containers away from the first treatment unit, and a second treatment unit which is arranged downstream of the first treatment unit in the transport direction of the containers and which treats the containers in a second predefined manner, wherein the transport device has a first transport unit for transporting the containers and this first transport unit has a guide device which makes contact with the containers and relative to which the containers are moved. The transport device has a second transport unit which is arranged downstream of the first transport unit in the transport direction of the containers and which rotates the containers through a predefined angle relative to the container longitudinal axis during transport of the containers.

20 Claims, 2 Drawing Sheets

APPARATUS AND METHOD FOR TREATING CONTAINERS WITH ROTATION OF THE CONTAINERS

BACKGROUND

The present invention relates to an apparatus for treating containers. Such apparatuses or systems have been known for a long time from the prior art. It is customary that the individual treatment steps are carried out in a plurality of steps, for example firstly plastic containers are produced from plastic preforms, then the containers are filled and/or also labelled. In the context of this description, the term container refers both to plastic containers that have already been produced and to the precursors thereof, such as plastic preforms for example.

In the prior art, the respective plastic containers are usually transported by means of transport devices from one treatment unit to the next treatment unit. Such treatment units may be for example transport starwheels which transport the containers in an appropriate manner. In addition, however, other transport devices are also known, such as for example air conveyors in which the containers are guided at their carrying ring and are conveyed by means of air pressure. The present invention relates in particular to those containers that have a cross-section differing from a circular cross-section, such as for example a rectangular cross-section or the like.

Depending on the way in which the containers are processed in the respective subsequent machines, the container in some cases has to be transported and fed to the respective machine in an orientation that remains constant. Different possibilities are nowadays known for this purpose, for example orientation in a starwheel, by a mechanical rotating device or the like.

SUMMARY

The object of the present invention is to configure in a more space-saving manner such systems for treating containers.

An apparatus according to the invention for treating containers comprises a first treatment unit which treats the containers in a first predefined manner. In addition, the apparatus comprises a transport device which transports the containers away from the first treatment unit, and a second treatment unit which is arranged downstream of the first treatment unit in the transport direction of the containers and which treats the containers in a second predefined manner. The transport device has a first transport unit for transporting the containers and this first transport unit has a guide device which makes contact with the containers and relative to which or by means of which the containers are moved (in particular along a predefined transport path).

According to the invention, the transport device has a second transport unit which is arranged downstream of the first transport unit in the transport direction of the containers and which rotates the containers through a predefined angle relative to the container longitudinal axis during transport of said containers.

The first transport unit is advantageously configured in such a way that the containers are guided relative to at least one element of this first transport unit, for example relative to a rail. The second transport unit then rotates the containers through a predefined angle, in particular through an angle of 90°. This second transport unit thus advantageously brings about a uniform rotation. The containers can be transferred to the second treatment unit in this rotated position and thus, as will be explained in more detail below, this second treatment unit can be configured in a more space-saving manner.

Advantageously, the second transport unit feeds the containers in the rotated position to the second treatment unit. In this rotated position, it is then possible that the individual treatment stations of the treatment unit, for example filling stations, can be arranged closer to one another and in this way the arrangement as a whole can be configured in a more space-saving manner.

Advantageously, the rotated position is a position in which a maximum number of containers and/or of treatment units accommodating or treating said containers can be arranged along the transport path of the containers.

In a further advantageous embodiment, the first transport unit is an air conveyor. In this case, the containers are guided preferably not individually but rather one behind the other, for example in a manner suspended by their carrying ring. Particularly in the case of containers having a non-circular cross-section, transport in the air conveyor means that the containers orient themselves so that the longer side thereof is substantially parallel to the air flow. In this orientation, transfer to a further treatment unit, such as a filling device for example, is unfavourable since in this case a relatively large spacing or a relatively great separation for the individual containers must be observed. Advantageously, the containers are conveyed by means of compressed air.

In this way it is possible that for example rectangular containers can be conveyed longitudinally during the air transport and thus no rotation occurs during the air transport. Then, at the respective next machine, which may be for example a filling machine or a labelling machine or the like, the containers are rotated back from a longitudinal position to a transverse position. In this way, among other things, the subsequent machine can be configured with a smaller size since the separation in the machine is reduced due to the transverse running of the containers.

In a further advantageous embodiment, the first treatment unit or the second treatment unit is configured from a group of treatment units which includes transforming devices for transforming plastic preforms into plastic containers, labelling devices (in particular for containers), sterilising devices (in particular for containers), filling devices (in particular for containers), closing devices (in particular for containers) and the like. In one particularly preferred embodiment, the first treatment unit is a transforming device for transforming plastic preforms into plastic containers, and the second treatment unit is a filling device which fills the plastic containers produced with a liquid and in particular a beverage.

In a further advantageous embodiment, the second transport unit transports the containers along a predefined transport path. This means that the second transport unit transports the containers along the predefined path and in particular also brings about the rotation of the containers during this transport.

In a further preferred embodiment, the second transport unit makes contact with the containers on the main body thereof. This means that the containers are contacted, in particular for the purpose of rotation, below their mouth (but above the base), i.e. in particular in a region of the main body.

In a further advantageous embodiment, the second transport unit has two rotatable screws located opposite one another (which are preferably arranged or installed on a container transporter), between which the containers are conveyed. In this case, therefore, the transport of the containers can take place by means of two screws located opposite one another, but it is possible that further screws are used, for example two opposite one another and two above one another, so that overall the container is conveyed by four screws. This embodiment is particularly advantageous in the case of larger containers or for better stability of the containers during the rotation.

In a further advantageous embodiment, the arrangement of the screws may also be such that only those containers which have a cross-section differing from a circular cross-section pass through these screws. In this case it is possible that, when processing round containers on the same line, said second transport unit is removed from the transport path, for example is pivoted to the side. In this way, different shapes and sizes of container can be processed and the second transport unit described here is used only when there is a need for orientation relative to the longitudinal direction of the containers.

However, it would also be possible that the second transport unit has a plurality of gripping elements which respectively grip the containers and thus transport said containers in particular individually, wherein with particular preference the containers can be rotated about their longitudinal axis by means of these gripping elements. The gripping elements could for example be configured as mandrels which protrude into the mouths of the containers and thus guide the latter. The second transport unit could also be configured as a rotary starwheel.

In one preferred embodiment, therefore, the second transport unit can be removed from the transport path of the containers. In this case, the described rotation of the containers about their longitudinal axis does not take place.

The present invention also relates to a method for treating containers. In said method, the containers are treated in a first predefined manner by means of a first treatment unit. The containers are then transported from the first treatment unit to a second treatment unit by means of a transport device, wherein the transport device has a first transport unit which transports the containers and the first transport unit has a guide device which makes contact with the containers and relative to which the containers are moved. In a further method step, the containers are treated by means of the second treatment unit in a second predefined manner, wherein this second predefined manner differs from the first predefined manner. Advantageously, the containers have a main body having a cross-section differing from a circular cross-section.

Advantageously, the second treatment unit has a plurality of treatment stations for treating containers. The containers are advantageously arranged on a carrier of the second treatment unit in such a rotary position relative to their longitudinal axis that the number of containers which can be accommodated is at a maximum (or a spacing between the longitudinal axes of two adjacent containers is at a minimum).

According to the invention, the transport device has a second transport unit which is arranged downstream of the first transport unit in the transport direction of the containers and which rotates the containers through a predefined angle relative to the container longitudinal axis during transport of said containers.

It is therefore also proposed with regard to the method that the containers are in each case rotated through a predefined angle before being fed to the second treatment unit.

In a further advantageous embodiment, the transport device guides the containers at least in some sections along a predefined straight transport path. For example, the first transport unit may be an air conveyor which conveys the containers preferably in a straight line. The second transport unit, which additionally rotates the containers, may also be a conveyor which transports the containers along a straight transport path.

In a further advantageous embodiment, at least one treatment unit transports the containers along a circular transport path.

BRIEF DESCRIPTION OF THE DRAWINGS

Further advantages and embodiments will become apparent from the appended drawings. In the drawings.

DETAILED DESCRIPTION

Figure 1:
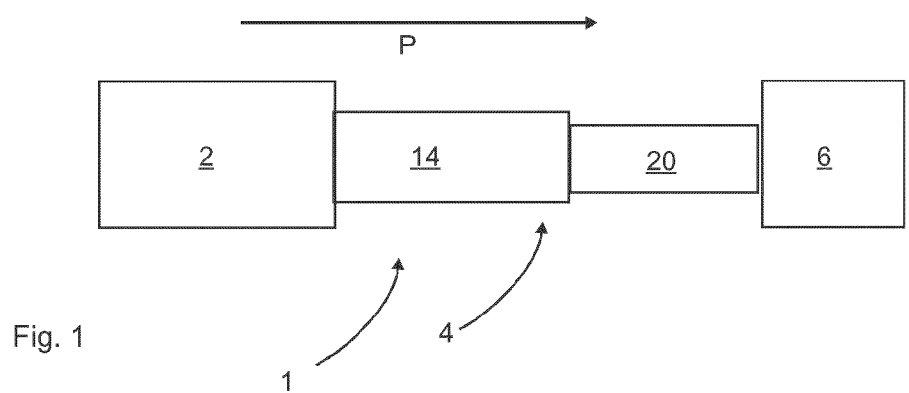
FIG. 1 shows a schematic block diagram of an apparatus according to the invention.

FIG. 1 shows a block diagram of an apparatus 1 according to the invention. This apparatus comprises a first treatment unit 2 which treats containers (not shown) in a first predefined manner. Thereafter, the containers are transported to a second treatment unit 6 by a transport device, denoted in its entirety by 4, which has two transport units 14 and 20. The second treatment unit likewise treats the containers in a predefined manner.

The first transport unit 14 is preferably an air conveyor which transports the containers not individually but rather in a manner arranged alongside one another. Reference 20 denotes a second transport unit which rotates the containers transported by the first transport unit 14 through a predefined angle, for example through 90°.

Figure 2:
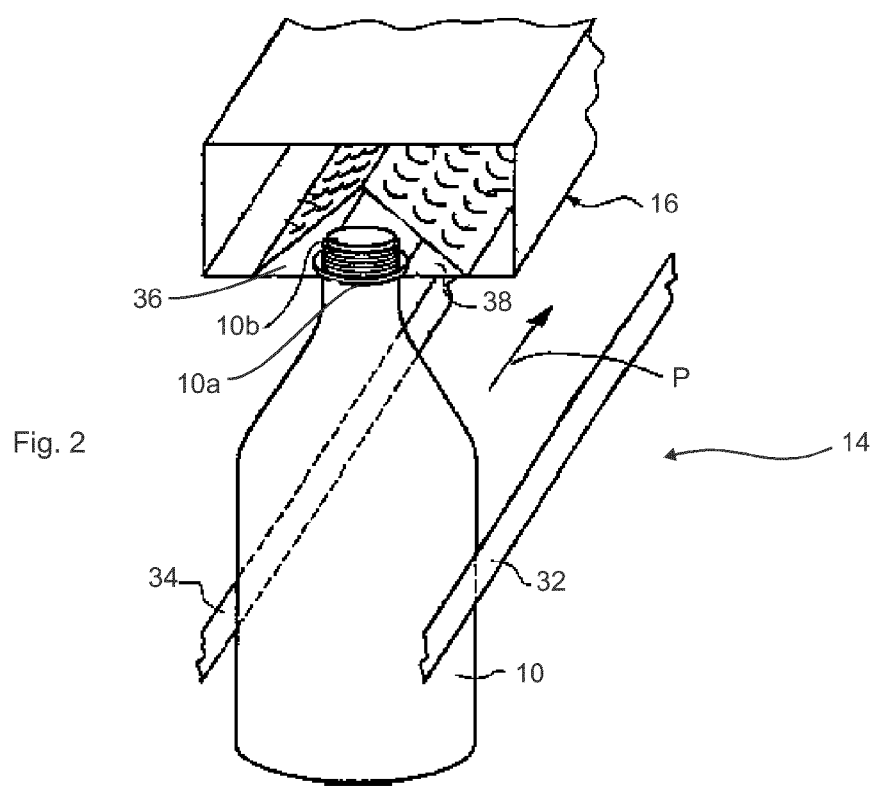
FIG. 2 shows a schematic diagram of an air conveyor.

FIG. 2 shows a schematic diagram of a first transport unit 14 which, taken per se, is known from the prior art. This transport unit 14 has a guide device 16 which supports the containers 10 at their carrying ring, wherein the containers 10 are movable relative to this guide device (and preferably in a manner suspended thereon). References 36 and 38 denote guide rails on which the container rests with its carrying ring 10a. The container 10, which is shown as circular here but which in the context of the invention preferably has a cross-section differing from a circular cross-section, is transported along the transport path P. References 32 and 34 denote further guide elements which guide the container 10 laterally during the movement thereof along the transport path P. The containers are in particular plastic containers.

Reference 10b denotes a mouth of the container, which is arranged above the carrying ring 10a. Here, the container 10 is advantageously transported along the transport path P as a result of being acted upon by compressed air. If the container 10 has a cross-section differing from a circular cross-section, then it will tend to rotate relative to its longitudinal axis L when acted upon by an air flow, so that its longer axis runs parallel to the air flow.

Figure 3:
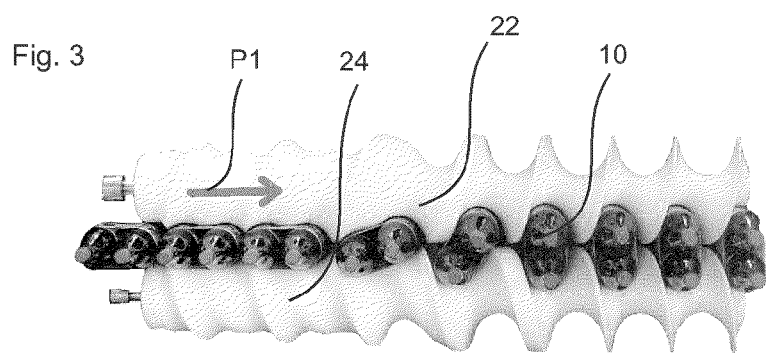
FIG. 3 shows a schematic diagram of a second transport unit.

FIG. 3 shows a schematic diagram of a second transport unit 20. Here, this second transport unit 20 has two screws 22, 24, between which the containers, here container packs, are conveyed along the transport path P1. These two screws rotate about two axes X, Y which are parallel to one another. It can be seen that these screws are adapted to one another in such a way that the containers are rotated, here through 90°, by the respective actions of the outer circumferences of the screws 22, 24. A suitable configuration is also possible when the containers are not packs of two bottles but rather are containers having an outer circumference which differs from a circular cross-section.

In addition, it would also be possible that the second transport unit is additionally configured as a separating unit which produces a predefined separation between the individual containers so that the containers can be accepted with the correct separation by a further unit, such as for example the second treatment unit. The second transport unit 20 thus causes all the containers transported by it to be rotated through a predefined angle relative to their longitudinal axis L, here through 90°.

Figure 4:
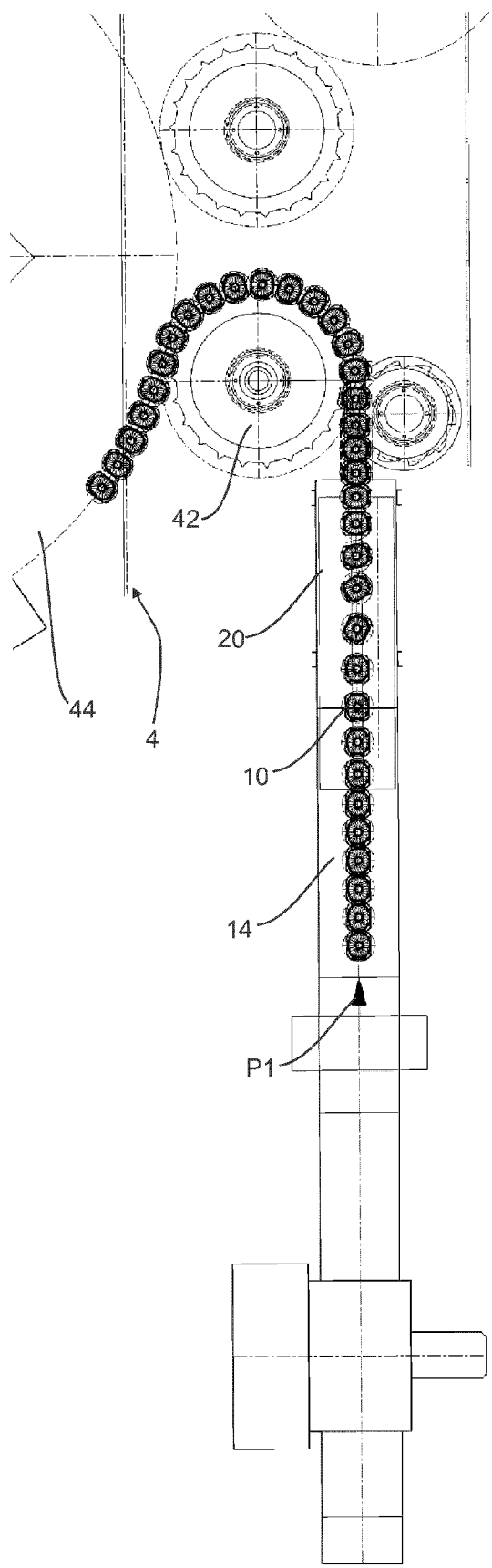
FIG. 4 shows a further diagram of an apparatus according to the invention.

FIG. 4 shows a further diagram of an apparatus 1 according to the invention. It is once again possible to see here the first transport unit 14, which is configured as an air conveyor and conveys the containers in the direction of the arrow P1. Immediately adjoining this first transport unit is a second transport unit 20 which, as shown here, rotates the containers through 90° in the clockwise direction. This second transport unit 20 is in turn adjoined by a second treatment unit, denoted as a whole by 4. This second treatment unit 4 has an infeed starwheel 42 which transfers the containers 10 to a carrier wheel 44 for treatment. It can be seen that the containers here are supplied to the infeed starwheel 42 already in such a way that the shorter side of the containers is fed tangentially to the feed wheel 42. The containers 10 are also arranged on the carrier 44 in such a way that the respective shorter side of the containers runs tangentially to the carrier 44 (or substantially in the circumferential direction thereof).

In this way, a considerable space saving can be achieved for the treatment of the containers by the second treatment unit 4.

The applicant reserves the right to claim all the features disclosed in the application documents as essential to the invention in so far as they are novel individually or in combination with respect to the prior art.

What is claimed is:

1. An apparatus for treating containers, comprising: a first treatment unit which treats the containers in a first predefined manner, a transport device which transports the containers away from the first treatment unit, and a second treatment unit which is arranged downstream of the first treatment unit in the transport direction of the containers and which treats the containers in a second predefined manner, wherein the transport device has a first transport unit for transporting the containers and said first transport unit has a guide device which makes contact with the containers and relative to which the containers are moved, wherein the transport device has a second transport unit which is arranged downstream of the first transport unit in the transport direction of the containers and which rotates the containers through a predefined angle relative to the container longitudinal axis during transport of said containers, wherein the first transport unit is an air conveyor.

2. The apparatus according to claim 1, wherein the second transport unit feeds the containers in the rotated position to the second treatment unit.

3. The apparatus according to claim 1, wherein the first treatment unit and/or the second treatment unit is selected from a group of treatment units consisting essentially of transforming devices for transforming plastic preforms into plastic containers, labeling devices, sterilizing devices, filling devices, and closing devices.

4. The apparatus according to claim 1, wherein the second transport unit transports the containers along a predefined transport path.

5. The apparatus according to claim 1, wherein the second transport unit makes contact with the containers between the base thereof and the mouth thereof on the main body thereof.

6. The apparatus according to claim 1, wherein the second transport unit has two rotatable screws located opposite one another, between which the containers are conveyed.

7. The apparatus according to claim 1, wherein the rotated position is a position in which a maximum number of containers can be arranged along the transport path of the containers.

8. The apparatus according to claim 1, wherein the rotated position is a position in which a maximum number of treatment units accommodating or treating said containers can be arranged along the transport path of the containers.

9. The apparatus according to claim 1, wherein the second transport unit has a plurality of gripping elements which respectively grip the containers and thus transport said containers.

10. The apparatus according to claim 9, wherein the gripping elements grip the containers individually.

11. The apparatus according to claim 9, wherein the containers can be rotated about their longitudinal axis by means of the gripping elements.

12. The apparatus according to claim 9, wherein the gripping elements are configured as mandrels which protrude into the mouths of the containers.

13. The apparatus according to claim 10, wherein the containers can be rotated about their longitudinal axis by means of the gripping elements.

14. The apparatus according to claim 10, wherein the gripping elements are configured as mandrels which protrude into the mouths of the containers.

15. The apparatus according to claim 11, wherein the gripping elements are configured as mandrels which protrude into the mouths of the containers.

16. A method for treating containers, comprising the steps:
    treating the containers in a first predefined manner by means of a first treatment unit;
    transporting the containers from the first treatment unit to a second treatment unit by means of a transport device, wherein the transport device has a first transport unit which transports the containers and the first transport unit has a guide device which makes contact with the containers and relative to which the containers are moved, the first transport unit being an air conveyor;
    treating the containers by means of the second treatment unit in a second predefined manner which differs from the first predefined manner,
    wherein the transport device has a second transport unit which is arranged downstream of the first transport unit in the transport direction of the containers and is removable from a transport path of the containers and which rotates the containers through a predefined angle relative to their container longitudinal axis during transport of said containers.

17. The method according to claim 16, wherein the transport device guides the containers at least in some sections along a predefined straight transport path.

18. The method according to claim 16, wherein at least one treatment unit transports the containers along a circular transport path.

19. An apparatus for treating containers, comprising: a first treatment unit which treats the containers in a first predefined manner, a transport device which transports the containers away from the first treatment unit, and a second treatment unit which is arranged downstream of the first treatment unit in the transport direction of the containers and which treats the containers in a second predefined manner, wherein the transport device has a first transport unit for transporting the containers and said first transport unit has a guide device which makes contact with the containers and relative to which the containers are moved, wherein the transport device has a second transport unit which is arranged downstream of the first transport unit in the transport direction of the containers and which rotates the containers through a predefined angle relative to the container longitudinal axis during transport of said containers, wherein the second transport unit has a plurality of gripping elements which respectively grip the containers and thus transport said containers and wherein the containers can be rotated about their longitudinal axis by means of these gripping elements and/or wherein the gripping elements are configured as mandrels which protrude into the mouths of the containers.

20. An apparatus for treating containers, comprising: a first treatment unit which treats the containers in a first predefined manner, a transport device which transports the containers away from the first treatment unit, and a second treatment unit which is arranged downstream of the first treatment unit in the transport direction of the containers and which treats the containers in a second predefined manner, wherein the transport device has a first transport unit for transporting the containers and said first transport unit has a guide device which makes contact with the containers and relative to which the containers are moved, wherein the transport device has a second transport unit which is arranged downstream of the first transport unit in the transport direction of the containers and which rotates the containers through a predefined angle relative to the container longitudinal axis during transport of said containers, wherein the fist treatment unit is a transforming device for transforming plastic preforms in plastic containers.

\* \* \* \* \*